United States Patent
Kurumagawa et al.

(10) Patent No.: US 7,322,709 B2
(45) Date of Patent: Jan. 29, 2008

(54) SIDE-MIRROR-CONTROLLING APPARATUS

(75) Inventors: Hiroshi Kurumagawa, Anjo (JP); Tomoyuki Ichi, Anjo (JP); Mitsuo Kurano, Niiza (JP)

(73) Assignee: Kabushiki Kaisha Honda Access, Niiza-shi, Saitama (JP)

( * ) Notice: Subject to any disclaimer, the term of this patent is extended or adjusted under 35 U.S.C. 154(b) by 102 days.

(21) Appl. No.: 10/892,288

(22) Filed: Jul. 16, 2004

(65) Prior Publication Data

US 2005/0030654 A1    Feb. 10, 2005

(30) Foreign Application Priority Data

Jul. 18, 2003   (JP) .............................. 2003-276475

(51) Int. Cl.
    *G02B 7/182*   (2006.01)
(52) U.S. Cl. ..................................... 359/872
(58) Field of Classification Search ............... 359/838, 359/871–880
    See application file for complete search history.

(56) References Cited

U.S. PATENT DOCUMENTS 5,052,792 A * 10/1991 McDonough ............... 359/843
6,805,472 B2 * 10/2004 Fukawa ...................... 362/466

FOREIGN PATENT DOCUMENTS

JP   2001-180376    7/2001
JP   2001-287589    10/2001

* cited by examiner

*Primary Examiner*—Euncha P. Cherry
(74) *Attorney, Agent, or Firm*—Westerman, Hattori, Daniels & Adrian, LLP

(57) ABSTRACT

A door-mirror-controlling apparatus includes an ECU, a velocity detector, a turn-signal lamp, and a DC motor; the ECU includes an MPU and a motor driver circuit. The velocity detector detects the velocity of an automobile, and outputs a velocity signal to the ECU. The MPU outputs an outer-turn-start signal to the motor driver circuit when the turn-signal lamp is blinking while the automobile is moving at a predetermined velocity or more. When the motor driver circuit receives the outer-turn-start signal, it outputs a signal to the DC motor and the DC motor rotates such that a reflective surface of a mirror turns outward, away from the automobile, compared to its original state.

16 Claims, 4 Drawing Sheets

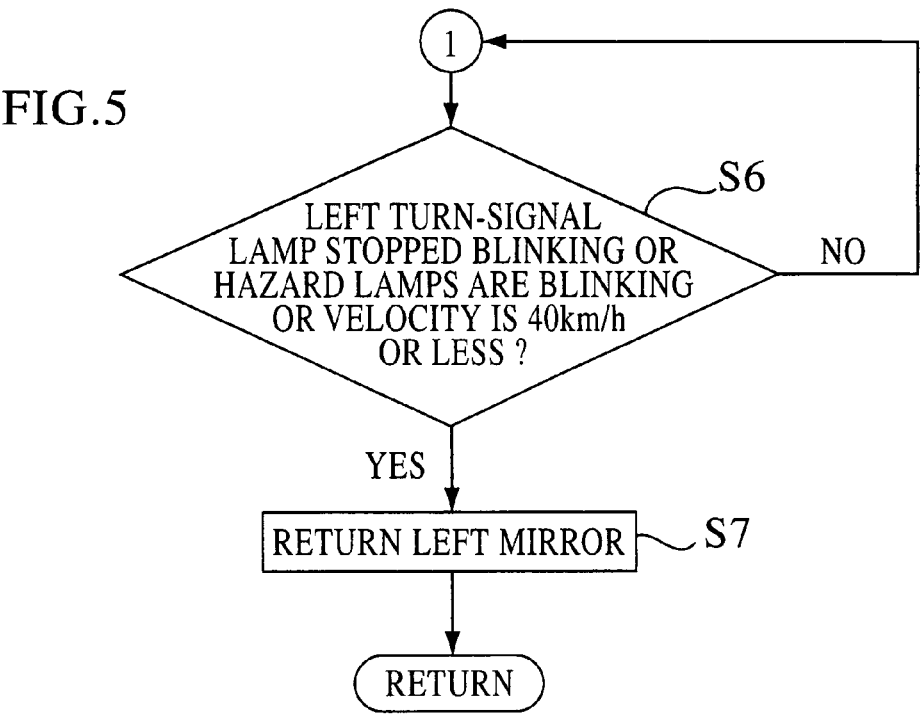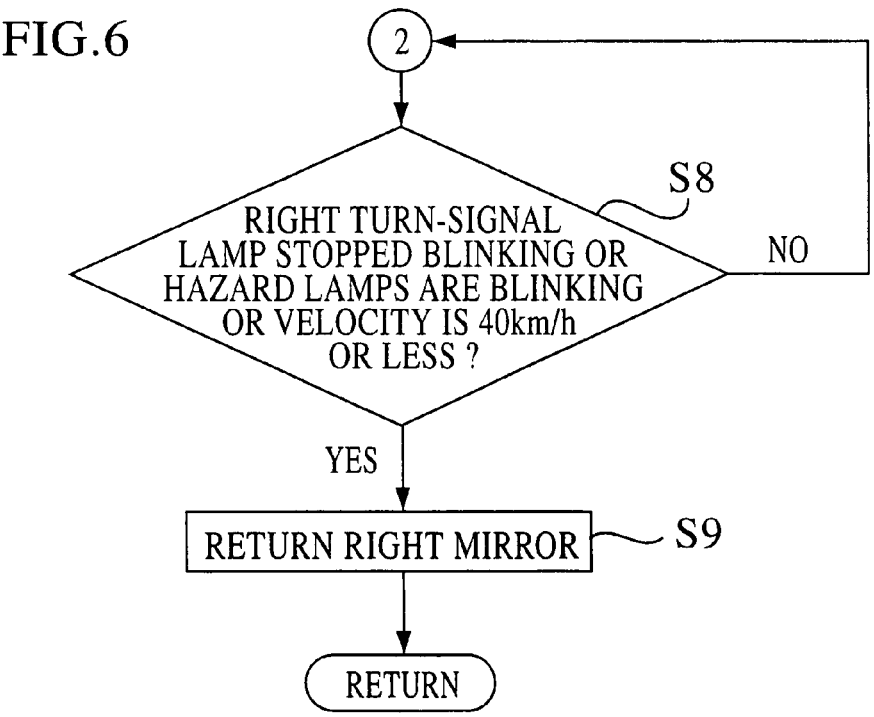

SIDE-MIRROR-CONTROLLING APPARATUS

BACKGROUND OF THE INVENTION

1. Field of the Invention

The present invention relates to a side-mirror-controlling apparatus for a vehicle.

2. Description of the Related Art

Rear-view-mirror-controlling apparatus which drive a rear-view mirror installed in an automobile cabin in accordance with the state of a turn-signal switch of an automobile are known (refer to, for example, Japanese Unexamined Patent Application Publications Nos. 2001-180376 and 2001-287589).

Such a rear-view-mirror-controlling apparatus is provided with a turn-signal switch, a drive device for driving the rear-view mirror, and a control device for controlling the drive device.

A process of driving the rear-view mirror using a rear-view-mirror-controlling apparatus will be described below.

When, for example, a driver turns on the turn-signal switch to the right, a turn-signal lamp on the right side starts blinking. At the same time, the turn-signal switch outputs a signal to the control device. When the control device receives this signal, it controls the drive device such that the rear-view mirror turns to the right from its original position. Accordingly, the rear-view mirror turns to the right from its original position. Therefore, the driver can visually check the right rear of the automobile. Similarly, when the driver turns on the turn-signal switch to the left, he or she can visually check the left rear of the automobile.

On the other hand, when, for example, the driver tries to change lanes, he or she visually checks the side of the automobile. Accordingly, a technique for reducing the driver's action for checking the side has been demanded, and the inventors of the present invention have developed such a technique.

SUMMARY OF THE INVENTION

In view of the above-described situation, an object of the present invention is to provide a mirror-controlling apparatus which reduces the driver's action for visually checking the side of a vehicle when, for example, the driver tries to change lanes.

According to the present invention, a side-mirror-controlling apparatus includes a direction-changing unit for driving mirrors including left and right side-mirror units of a vehicle so as to change the orientation of the mirror surfaces, of the mirrors, and a controlling unit for controlling the direction-changing unit. The controlling unit detects operations performed by a driver of the vehicle when the driver tries to change lanes or to turn left or right, and controls the direction-changing unit such that the mirror surface of at least one of the mirrors is put into an outward-facing state in which the mirror surface faces outward, away from the vehicle, compared to a basic state when the controlling unit detects one of the operations.

The basic state of the mirror surface refers to the state of the mirror surface in which the vehicle is in a normal driving state and is not changing lanes or turning left or right.

Accordingly, when the controlling unit detects one of the operations performed by the vehicle's driver when the driver tries to change lanes or turn left or right, the mirror surface of at least one of the mirrors is put into an outward-facing state so that the driver can easily see the side of the vehicle. Accordingly, the driver can visually check the side of the vehicle with a small action. As a result, the driver's action for visually checking the side of the vehicle when, for example, the driver tries to change lanes, is reduced.

In addition, according to the side-mirror-controlling apparatus of the present invention, the operations may include an operation for causing a left turn-signal lamp or a right turn-signal lamp to blink, an operation of switching on a turn-signal switch, and an operation of increasing a steering angle of a steering wheel to a predetermined angle or more. In this case, the controlling unit controls the direction-changing unit such that the mirror surface of at least one of the mirrors is put into the outward-facing state when the controlling unit detects one of the above-mentioned operations.

In such a case, when the controlling unit detects one of the operations for causing the left turn-signal lamp or the right turn-signal lamp to blink, the operation of switching on the turn-signal switch, and the operation of increasing the steering angle to the predetermined angle or more, the mirror surface of at least one of the mirrors is put into the outward-facing state so that the driver can easily see the side of the vehicle. Accordingly, the driver's action for visually checking the side of the vehicle when, for example, the driver tries to change lanes is reduced.

In addition, according to the side-mirror-controlling apparatus of the present invention, the controlling unit may further detect at least one of the operations for causing the left turn-signal lamp or the right turn-signal lamp to go out, an operation of switching off the turn-signal switch, and an operation of reducing the steering angle to less than the predetermined angle. When the controlling unit detects one of the operations for causing the left turn-signal lamp or the right turn-signal lamp to go out, the operation of switching off the turn-signal switch, and the operation of reducing the steering angle to less than the predetermined angle, after controlling the direction-changing unit such that the mirror surface of at least one of the mirrors is put into the outward-facing state, the controlling unit controls the direction-changing unit such that the mirror surface returns to its original state.

In such a case, when the controlling unit detects one of the operations for causing the left turn-signal lamp or the right turn-signal lamp to go out, the operation of switching off the turn-signal switch, and the operation of reducing the steering angle to less than the predetermined angle, while the mirror surface of at least one of the mirrors is in the outward-facing state, the mirror surface returns to its original state. Therefore, after the completion of, for example, a lane change, that is, after the vehicle has returned to its normal driving state, the viewing range of the mirror surface returns to the viewing range of its normal driving state.

In addition, according to the side-mirror-controlling apparatus of the present invention, the controlling unit may control the direction-changing unit so as to change the orientation of the mirror surface in the left side-mirror unit, when the controlling unit detects one of the operations for causing the left turn-signal lamp to blink, the operation of switching on the turn-signal switch to the left, and the operation of increasing the steering angle to the predetermined angle or more in the leftward direction, and control the direction-changing unit so as to change the orientation of the mirror surface in the right side-mirror unit when the controlling unit detects one of the operations for causing the right turn-signal lamp to blink, the operation of switching on the turn-signal switch to the right, and the operation of increasing the steering angle to the predetermined angle or more in the rightward direction.

In such a case, the orientation of the mirror surface in the left side-mirror unit is controlled when the controlling unit detects one of the operations for causing the left turn-signal lamp to blink, the operation of switching on the turn-signal switch to the left, and the operation of increasing the steering angle to the predetermined angle or more in the leftward direction. Similarly, the orientation of the mirror surface in the right side-mirror unit is controlled when the controlling unit detects one of the operations for causing the right turn-signal lamp to blink, the operation of switching on the turn-signal switch to the right, and the operation of increasing the steering angle to the predetermined angle or more in the rightward direction. Thus, when the controlling unit detects one of the operations for causing the left turn-signal lamp or the right turn-signal lamp to blink, the operation of switching on the turn-signal switch to the left or right, and the operation of increasing the steering angle to the predetermined angle or more in the leftward or rightward direction, the controlling unit controls the orientation of the mirror surface in the corresponding side-mirror unit instead of controlling the orientation of both of the mirror surfaces in the left and right door-mirror units. Accordingly, the durability of the direction-changing unit (for example, gear devices for moving the mirror surfaces) used for changing the orientations of the mirror surfaces of the mirrors is increased.

In addition, the side-mirror-controlling apparatus according to the present invention may further include a velocity-detecting unit for detecting the velocity of the vehicle. The controlling unit controls the direction-changing unit such that the mirror surfaces are kept in the original state while the velocity of the vehicle is at a predetermined velocity or less.

When, for example, the vehicle turns left or right at an intersection while moving at a low velocity, the driver visually checks a region near the corresponding side of the vehicle.

According to the present invention, the mirror surfaces are kept in their original states while the velocity of the vehicle is a predetermined velocity or less. In this case, the driver can easily see the region near the side of the vehicle. Therefore, when the vehicle turns left or right at an intersection while moving at a low velocity, the driver can visually check the region near the corresponding side of the vehicle with the corresponding mirror surface, which is in its original state.

In addition, according to the side-mirror-controlling apparatus of the present invention, the direction-changing unit comprises DC motors for the respective mirrors and the controlling unit comprises a rotational angle detector and a control main unit. The rotational angle detector detects a current variation caused by the rotation of each DC motor as a waveform signal and outputs a specific pulse signal generated from the detected waveform signal. The control main unit counts the number of pulses included in the specific pulse signal output from the rotational signal detector, calculates the amount of control required for changing the orientation of the corresponding mirror surface on the basis of the number of pulses, and controls the DC motor on the basis of the result of such calculation.

Generally, in order to accurately put each mirror surface into the predetermined outward-facing state and return it to its original state, a position sensor or the like must be used for detecting the position of the mirror surface.

In the present invention, the rotational angle of each DC motor, that is, the amount of control of the orientation of the corresponding mirror surface is determined on the basis of the variation in the current applied to the DC motor, which is caused by the rotation of the DC motor. Therefore, each mirror surface is reliably put into the outward-facing state and returned to its original state without using a position sensor or the like. As a result, the size of the side-mirror-controlling apparatus is reduced.

The advantages of the present invention will be described below.

When the controlling unit detects one of the operations performed by the vehicle's driver when the driver tries to change lanes or turn left or right, the mirror surface of at least one of the mirrors is put into the outward-facing state so that the driver can easily see the side of the vehicle. Accordingly, the driver can visually check the side of the vehicle with a small action. As a result, the driver's action for visually checking the side of the vehicle when, for example, the driver tries to change lanes, is reduced.

In addition, when the controlling unit detects one of the operations for causing the left turn-signal lamp or the right turn-signal lamp to blink, the operation of switching on the turn-signal switch, and the operation of increasing the steering angle to the predetermined angle or more, the mirror surface of at least one of the mirrors is put into the outward-facing state so that the driver can easily see the side of the vehicle. Accordingly, the driver's action for visually checking the side of the vehicle when, for example, when the driver tries to change lanes, is reduced.

In addition, when the controlling unit detects one of the operations for causing the left turn-signal lamp or the right turn-signal lamp to go out, the operation of switching off the turn-signal switch, and the operation of reducing the steering angle to less than the predetermined angle while the mirror surface of at least one of the mirrors is in the outward-facing state, the mirror surface returns to the basic state. Therefore, after the completion of, for example, a lane change, that is, after the vehicle has returned to the normal driving state, the viewing range of the mirror surface returns to the range of the normal driving state.

In addition, the orientation of the mirror surface in the left side-mirror unit is controlled when the controlling unit detects one of the operations for causing the left turn-signal lamp to blink, the operation of switching on the turn-signal switch to the left, and the operation of increasing the steering angle to the predetermined angle or more in the leftward direction, and the orientations of the mirror surface in the right side-mirror unit is controlled when the controlling unit detects one of the operations for causing the right turn-signal lamp to blink, the operation of switching on the turn-signal switch to the right, and the operation of increasing the steering angle to a predetermined angle or more in the rightward direction. Thus, when the controlling unit detects one of the operations for causing the left turn-signal lamp or the right turn-signal lamp to blink, the operation of switching on the turn-signal switch to the left or right, and the operation of increasing the steering angle to a predetermined angle or more in the leftward or rightward direction, the controlling unit controls the orientation of the mirror surface in the corresponding side-mirror unit. Therefore, compared to the case in which the controlling unit controls the orientation of both of the mirror surfaces in the left and right door-mirror units, the durability of the direction-changing unit (for example, gear devices for moving the mirror surfaces) used for changing the orientations of the mirror surfaces of the mirrors is increased.

In addition, the mirror surfaces are kept in their original states while the velocity of the vehicle is the predetermined velocity or less. In this case, the driver can easily see the region near the sides of the vehicle. Therefore, when the vehicle turns left or right at an intersection while moving at a low velocity, the driver can visually check the region near the corresponding side of the vehicle with the corresponding mirror surface, which is in its original state.

In addition, according to the present invention, the rotational angle of each DC motor, that is, the amount of control of the orientation of the corresponding mirror surface is determined on the basis of the variation in the current applied to the DC motor, which is caused by the rotation of the DC motor. Therefore, each mirror surface is reliably put into the outward-facing state and returned to its original state without using a position sensor or the like. As a result, the size of the side-mirror-controlling apparatus is reduced.

BRIEF DESCRIPTION OF THE DRAWINGS

FIG. 5 is a flowchart of another part of the process for controlling the mirror of the door-mirror using the door-mirror-controlling apparatus according to embodiment of the invention; and FIG. 6 is a flowchart of another part of the process for controlling the mirror of the door-mirror using the door-mirror-controlling apparatus according to embodiment of the invention.

DESCRIPTION OF THE PREFERRED EMBODIMENTS

Embodiments of the present invention will be described in detail below with reference to the accompanying drawings.

First Embodiment

First, the schematic construction of a remote-control door-mirror-controlling apparatus, which functions as a side-mirror-controlling apparatus, will be described. The detailed construction of the door-mirror-controlling apparatus will be described later.

Figure 1:
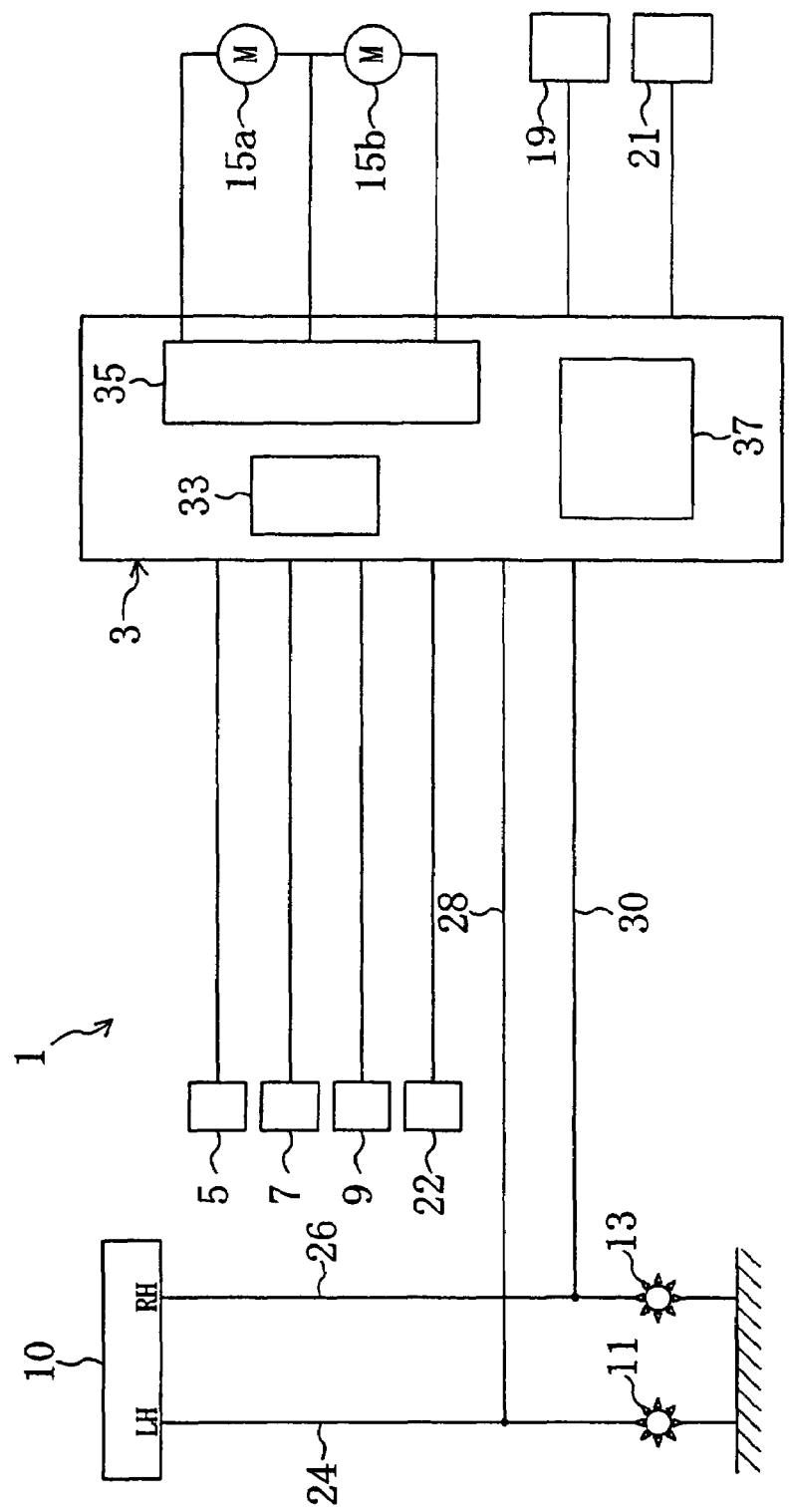
FIG. 1 is a circuit diagram of a door-mirror-controlling apparatus according to an embodiment of the present invention.

As shown in FIG. 1, a door-mirror-controlling apparatus 1 includes an electric control unit (hereafter abbreviated as ECU) 3 for controlling mirror units and cornering lamps in association with lane-change operations, an ignition switch 5, an ILL (illumination lamp) 7, a velocity detector 9, a turn-signal switch 10, a left turn-signal lamp 11, a right turn-signal lamp 13, a left direct-current (DC) motor 15a for changing the orientation of a reflective surface of a mirror 27 (see FIG. 2) included in a left door-mirror unit (the detailed structure of door-mirror units will be described in detail below), a right direct-current (DC) motor 15b for changing the orientation of a reflective surface of a mirror 27 included in a right door-mirror unit 23, a left cornering lamp 19, a right cornering lamp 21, and a steering-angle sensor 22 for detecting a steering angle of a steering wheel (not shown). The ignition switch 5, the ILL 7, the velocity detector 9, the turn-signal switch 10, the left turn-signal lamp 11, the right turn-signal lamp 13, the left DC motor 15a, the right DC motor 15b, the left cornering lamp 19, the right cornering lamp 21, and the steering-angle sensor 22 are all connected to the ECU 3. According to the present embodiment, the controlling means corresponds to the ECU 3, the velocity-detecting means corresponds to the velocity detector 9, the direction-changing means corresponds to either the left or right DC motors 15a or 15b, respectively, or both, and a mirror surface corresponds to the reflective surface.

The velocity detector 9 detects a velocity of the automobile and outputs to the ECU 3 a velocity signal representing the detected velocity.

The turn-signal switch 10 is used for causing the left and right turn-signal lamps 11 and 13 to blink, and is connected to the left and right turn-signal lamps 11 and 13 by first and second lines 24 and 26, respectively. In addition, the first and second lines 24 and 26 are connected to the ECU 3 by third and fourth lines 28 and 30, respectively. When the turn-signal switch 10 is turned on to the left, it transmits a left blink signal to the left turn-signal lamp 11, and the ECU 3 detects this signal. Similarly, when the turn-signal switch 10 is turned on to the right, it transmits a right blink signal to the right turn-signal lamp 13, and the ECU 3 detects this signal.

The left turn-signal lamp 11 is attached to the left side of an automobile body, and blinks when the turn-signal switch 10, which is installed in an automobile cabin, is turned on to the left. More specifically, the turn-signal switch 10 transmits the left blink signal to the left turn-signal lamp 11 when it is turned on to the left, and the left turn-signal lamp 11 starts blinking when it receives the left blink signal. Before the left blink signal is input to the left turn-signal lamp 11, it is processed by another ECU (not shown), which is different from the above-described ECU 3, so that the left turn-signal lamp 11 blinks at a predetermined blinking frequency. In addition, if the turn-signal switch 10, which has been turned on to the left, is turned off, the left turn-signal lamp 11 stops blinking. When the turn-signal switch 10 is turned on to the left, it can be turned off not only by manually turning off the turn-signal switch 10 but also by returning the steering wheel to the original position from the left.

The right turn-signal lamp 13 is attached to the right side of the automobile body, and blinks when the turn-signal switch 10 is turned on to the right. More specifically, the turn-signal switch 10 transmits the right blink signal to the right turn-signal lamp 13 when it is turned on to the right, and the right turn-signal lamp 13 starts blinking when it receives the right blink signal. In addition, if the turn-signal switch 10 which has been turned on to the right is turned off, the right turn-signal lamp 13 stops blinking. Other structures of the right turn-signal lamp 13 are similar to those of the left turn-signal lamp 11.

The ECU 3 includes a microprocessor unit (MPU) 33, a motor driver circuit 35, and a rotational-angle detector circuit 37. The ECU 3 receives the left blink signal from the turn-signal switch 10, and thereby detects that the turn-signal switch 10 has transmitted the left blink signal to the left turn-signal lamp 11. In other words, the ECU 3 detects that the driver has performed an operation for causing the left turn-signal lamp 11 to blink. If the ECU 3 detects that the left blink signal has been transmitted to the left turn-signal lamp 11 while the automobile is driving at a predetermined velocity (e.g., 60 km per hour in the present embodiment) or more, the MPU 33 included in the ECU 3 outputs a left outer-turn-start signal, which is used for turning the mirror 27 in the left door-mirror unit outward, to the motor driver circuit 35. The MPU 33 stops transmitting the left outer-turn-start signal to the motor driver circuit 35 when the reflective surface of the mirror 27 in the left door-mirror unit is turned outward by a predetermined angle. More specifically, the MPU 33 stores data regarding the number of pulses, which will be described in detail later, required for turning the reflective surface of the mirror 27 in the left door-mirror unit outward by the predetermined angle (e.g., 2° in the present embodiment), and monitors whether or not the left DC motor 15*a* has rotated by the amount corresponding to the number of pulses. When the left DC motor 15*a* is rotated in the forward direction by the amount corresponding to the above-described number of pulses, the MPU 33 stops transmitting the left outer-turn-start signal to the motor driver circuit 35. Thus, the reflective surface of the mirror 27 in the left door-mirror unit is turned outward by 2°.

In addition, when the turn-signal switch 10 which has been turned on to the left is turned off, the ECU 3 detects this. More specifically, the ECU 3 detects that the driver has performed an operation for causing the left turn-signal lamp 11 to go out. When the ECU 3 detects that the turn-signal switch 10, which has been turned on to the left, is turned off, the MPU 33 outputs a left inner-turn-start signal, which is used for turning the mirror 27 in the left door-mirror unit inward, to the motor driver circuit 35. The MPU 33 stops transmitting the left inner-turn-start signal to the motor driver circuit 35 when the reflective surface of the mirror 27 in the left door-mirror unit returns to its original state. More specifically, when the left DC motor 15*a* is rotated in the reverse direction by the amount corresponding to the above-described number of pulses, the MPU 33 stops transmitting the left inner-turn-start signal to the motor driver circuit 35. Thus, the reflective surface of the mirror 27 in the left door-mirror unit returns to its original basic state.

In addition, the ECU 3 also receives the right blink signal from the turn-signal switch 10, and thereby detects that the turn-signal switch 10 has transmitted the right blink signal to the right turn-signal lamp 13. If the ECU 3 detects that the right blink signal has been transmitted to the right turn-signal lamp 13 while the automobile is driving at 60 km per hour or more, the MPU 33 outputs a right outer-turn-start signal, which is used for turning the mirror 27 in the right door-mirror unit 23 outward, to the motor driver circuit 35. The MPU 33 stops transmitting the right outer-turn-start signal when the reflective surface of the mirror 27 in the right door-mirror unit 23 is turned outward by a predetermined angle. The detailed manner in which the MPU 33 stops transmitting the right outer-turn-start signal is similar to the manner in which it stops transmitting the left outer-turn-start signal.

In addition, when the turn-signal switch 10, which has been turned on to the right, is turned off, the ECU detects this. When the ECU 3 detects that the turn-signal switch 10 which has been turned on to the right is turned off, the MPU 33 outputs a right inner-turn-start signal to the motor driver circuit 35. The MPU 33 stops transmitting the right inner-turn-start signal when the reflective surface of the mirror 27 in the right door-mirror unit 23 returns to its original state. The detailed manner in which the MPU 33 stops transmitting the right inner-turn-start signal is similar to the manner in which it stops transmitting the left inner-turn-start signal.

The left DC motor 15*a* adjusts the angle of the reflective surface of the mirror 27 in the left door-mirror unit in the horizontal direction. More specifically, when the motor driver circuit 35 receives the left outer-turn-start signal, it outputs a signal to turn the mirror 27 in the left door-mirror unit outward to the left DC motor 15*a*, and the left DC motor 15*a* drives the mirror 27 in the left door-mirror unit such that the reflective surface of the mirror 27 faces outward, away from the automobile, compared to the current state. More specifically, the left DC motor 15*a* rotates when it receives the signal to turn the mirror 27 in the left door-mirror unit outward from the motor driver circuit 35, and thereby turns the reflective surface of the mirror 27 outward, away from the automobile, compared to its original state (basic state).

In addition, when the motor driver circuit 35 receives the left inner-turn-start signal, it outputs a signal to turn the mirror 27 in the left door-mirror unit inward to the left DC motor 15*a*, and the left DC motor 15*a* drives the mirror 27 in the left door-mirror unit such that the reflective surface of the mirror 27 returns to its original state (basic state). More specifically, the left DC motor 15*a* rotates when it receives the signal to turn the mirror 27 in the left door-mirror unit inward from the motor driver circuit 35, and thereby turns the reflective surface of the mirror 27 inward toward the automobile so that it returns to its original state.

The right DC motor 15*b* adjusts the angle of the reflective surface of the mirror 27 in the right door-mirror unit 23 in the horizontal direction. When the motor driver circuit 35 receives the right outer-turn-start signal, it outputs a signal to turn the mirror 27 in the right door-mirror unit 23 outward to the right DC motor 15*b*, and the right DC motor 15*b* drives the mirror 27 in the right door-mirror unit 23 such that the reflective surface of the mirror 27 faces outward, away from the automobile, compared to its original state. In addition, when the motor driver circuit 35 receives the right inner-turn-start signal, it outputs a signal to turn the mirror 27 in the right door-mirror unit 23 inward to the right DC motor 15*b*, and the right DC motor 15*b* drives the mirror 27 in the right door-mirror unit 23 such that the reflective surface of the mirror 27 returns to its original state.

The left and right cornering lamps 19 and 21 turn on when the left and right turn-signal lamps 11 and 13, respectively, start blinking at night.

Next, the structure of the door-mirror units will be described below.

Figure 2:
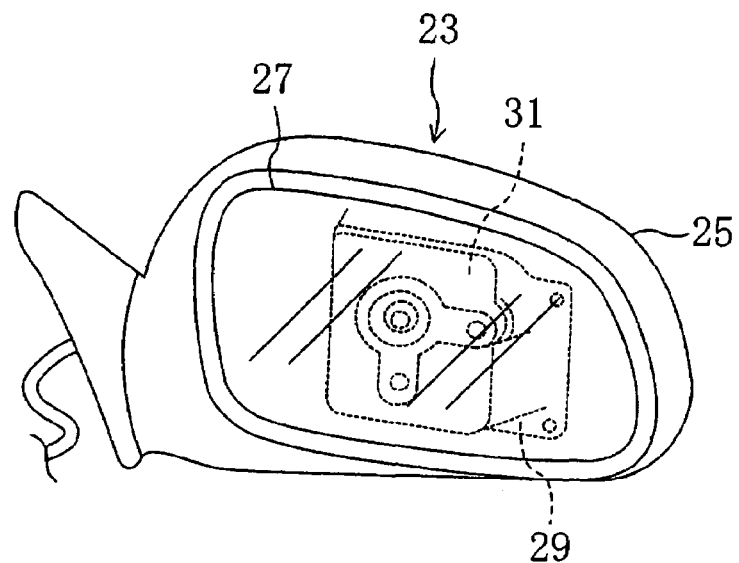
FIG. 2 is a perspective view of a door mirror according to embodiment of the invention.

As shown in FIG. 2, the right door-mirror unit 23 is attached to a right front pillar of the automobile at the lower end thereof, and includes a shell 25, the mirror 27 attached to the shell 25 at the rear end thereof, and an actuator assembly 29 disposed in the shell 25.

The mirror 27 is a plane mirror having a reflective surface which is almost entirely flat, and is attached to the actuator assembly 29 with a base plate 31 interposed therebetween.

The actuator assembly 29 includes the right DC motor 15*b* (see FIG. 1). In addition, the actuator assembly 29 also includes a DC motor (not shown) for adjusting the tilt angle of the mirror 27 in the vertical direction.

In addition, a side blinker (not shown) is provided on the door-mirror unit 23.

The left door-mirror unit is attached to a left front pillar of the automobile at the lower end thereof, and has a structure similar to that of the right door-mirror unit 23.

Next, the detailed structure of the door-mirror-controlling apparatus 1 will be described.

Figure 3:
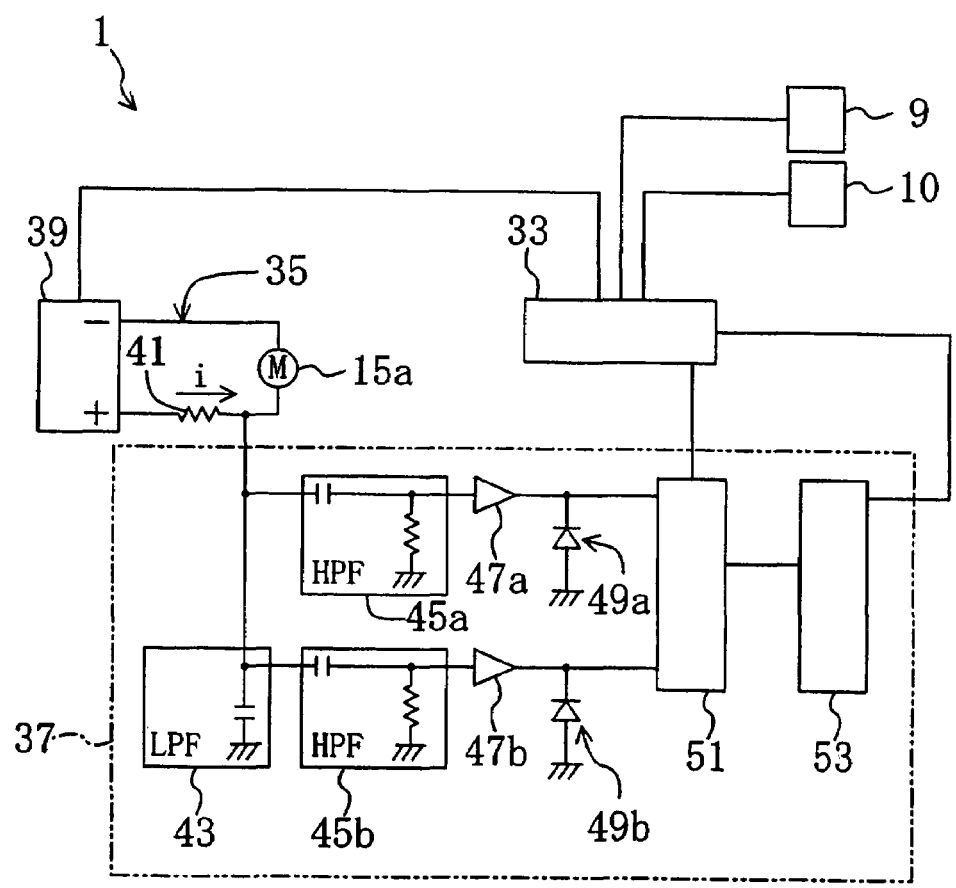
FIG. 3 is another circuit diagram of a door-mirror-controlling apparatus according to embodiment of the invention.

As shown in FIG. 3, the door-mirror-controlling apparatus 1 includes the velocity detector 9, the turn-signal switch 10, the MPU 33, the motor driver circuit 35, and the rotational-angle detector circuit 37. FIG. 3 mainly shows components for adjusting the angle of the mirror 27 in the left door-mirror unit in the horizontal direction. Components for adjusting the angle of the mirror 27 in the right door-mirror unit 23 in the horizontal direction are similar to those shown in FIG. 3. The MPU 33, the motor driver circuit 35 (excluding the DC motors 15a and 15b), and the rotational-angle detector circuit 37 are included in the above-described ECU 3. According to the present invention, a rotational signal detector corresponds to the rotational-angle detector circuit 37 and a control main unit corresponds to the MPU 33.

The velocity detector 9 and the turn-signal switch 10 are both connected to the MPU 33.

The velocity detector 9 outputs the velocity signal to the MPU 33.

The MPU 33 is connected to a motor driver 39, an analog switch 51, and a waveform-shaping circuit 53, which will be described later. The MPU 33 controls the motor driver 39 in accordance with the velocity signal, etc., which are input thereto.

If the left turn-signal lamp 11 is blinking while the automobile is moving at 60 km per hour or more, the MPU 33 outputs the left outer-turn-start signal to the motor driver 39. In addition, when the turn-signal switch 10, which has been turned on to the left, is turned off, the MPU 33 outputs the left inner-turn-start signal (left return signal) to the motor driver 39.

In addition, if the right turn-signal lamp 13 is blinking while the automobile is moving at 60 km per hour or more, the MPU 33 outputs the right outer-turn-start signal to the motor driver 39. In addition, when the turn-signal switch 10, which has been turned on to the right, is turned off, the MPU 33 outputs the right inner-turn-start signal (right return signal) to the motor driver 39.

The motor driver circuit 35 is provided with the left DC motor 15a, the motor driver 39, and a resistor 41.

The motor driver 39 adjusts the electric power supplied to the left DC motor 15a on the basis of signals input from the MPU 33, and thereby adjusts the angle of the mirror 27 in the left door-mirror unit.

One of two terminals of the left DC motor 15a is connected to a positive terminal of the motor driver 39 with the resistor 41 interposed therebetween, and the other terminal of the left DC motor 15a is directly connected to a negative terminal of the motor driver 39.

The rotational-angle detector circuit 37 is connected to the motor driver circuit 35 at a predetermined position thereof. In the present embodiment, the rotational-angle detector circuit 37 is connected to the motor driver circuit 35 at a position between the left DC motor 15a and the resistor 41. The rotational-angle detector circuit 37 detects a variation in the voltage across the resistor 41 included in the motor driver circuit 35 as a waveform signal.

The waveform signal is generated as described below.

When the DC motor 15a rotates, the positions of contact between a commutator and brushes in the motor 15a vary, and an electromotive force, induced in a plurality of electromagnetic coils included in the motor 15a, varies in accordance with the variation in the positions of contact. Therefore, the current i supplied to the motor driver circuit 35 varies periodically in accordance with the rotational angle of the motor 15a, and the voltage drop across the resistor 41 in the motor driver circuit 35 also varies. Accordingly, a pulse-shaped waveform signal is obtained by temporally detecting the voltage variation.

In the present embodiment, the door-mirror unit 23 is provided with a side blinker as described above. Therefore, the current supplied to the DC motor 15a is filtered such that the pulse signal obtained by the rotation of the DC motor 15a does not adversely affect the operation of the side blinker.

The rotational-angle detector circuit 37 includes a low-pass filter 43, high-pass filters 45a and 45b, amplifiers 47a and 47b, limiters 49a and 49b, the analog switch 51, and the waveform-shaping circuit 53.

The low-pass filter 43 removes high-frequency components of noise included in the waveform signal.

The high-pass filters 45a and 45b remove low-frequency components of the noise included in the waveform signal.

In the present embodiment, two high-pass filters are used. The reason for this is because it is necessary to change the current supplied depending on whether the DC motor 15a rotates in the forward direction or the reverse direction, since the load applied to the DC motor 15a differs depending on whether the reflective surface of the mirror 27 is moved such that it faces outward, away from the automobile, or inward toward the automobile. When the current supplied to the DC motor 15a is changed, the variation in the voltage across the resistor 41 also changes. Accordingly, the characteristics of the high-pass filter 45a, which is used for the forward rotation, are set suitably for the voltage variation detected when the DC motor 15a rotates in the forward direction, and the characteristics of the high-pass filter 45b, which is used for the reverse rotation, are set suitably for the voltage variation detected when the DC motor 15a rotates in the reverse direction.

The high-pass filters 45a and 45b are connected to the amplifiers 47a and 47b, respectively.

The amplifiers 47a and 47b amplify waveform signals from which the noise components are removed by the low-pass filter 43 and the high-pass filters 45a and 45b.

The reason why the rotational-angle detector circuit 37 is provided with the amplifiers 47a and 47b will be described below. The variation in the voltage across the resistor 41 detected by the rotational-angle detector circuit 37 is extremely small, such as several hundreds of millivolts. Therefore, in order to convert the waveform signal into square waves with the waveform-shaping circuit 53, it is necessary to increase the voltage variation in the waveform signal to about several volts to more than ten volts. Accordingly, the amplifiers 47a and 47b are used to increase the voltage variation to a threshold of a device used as the waveform-shaping circuit 53.

The amplifier 47a is connected to the analog switch 51 with the limiter 49a disposed therebetween, and the amplifier 47b is connected to the analog switch 51 with the limiter 49b disposed therebetween.

The analog switch 51 is connected to the waveform-shaping circuit 53. The analog switch 51 outputs one of the waveform signals input from the two amplifiers 47a and 47b to the waveform-shaping circuit 53 depending on the signals input from the MPU 33.

The waveform-shaping circuit 53 changes the shape of the waveform signal input from the analog switch 51 into square waves so that digital pulses are obtained, and outputs the digital pulses to the MPU 33.

Next, a process of controlling the mirrors of the door-mirror units using the door-mirror-controlling apparatus 1 according to the present embodiment will be described below.

When the Automobile Moves to the Left Lane

When the driver tries to move to the left lane, he or she turns on the turn-signal switch 10 to the left. Here it is assumed that the automobile is moving at 80 km per hour. At this time, the angle of each mirror 27 in the horizontal direction is set to a normal mirror angle. The normal mirror angle is the angle at which the driver can visually check other vehicles behind the automobile while the automobile is in the normal driving state in which a lane change or the like is not performed. The driver inputs this angle in the MPU 33 in advance. In the present invention, the original or basic state of a mirror surface refers to the state in which the angle of the corresponding mirror 27 is set to the normal mirror angle.

First, the left turn-signal lamp 11 starts blinking. At the same time, the ECU 3 detects that the turn-signal switch 10 has transmitted the left blink signal to the left turn-signal lamp 11, that is, that the driver has performed an operation for causing the left turn-signal lamp 11 to blink.

Figure 4:
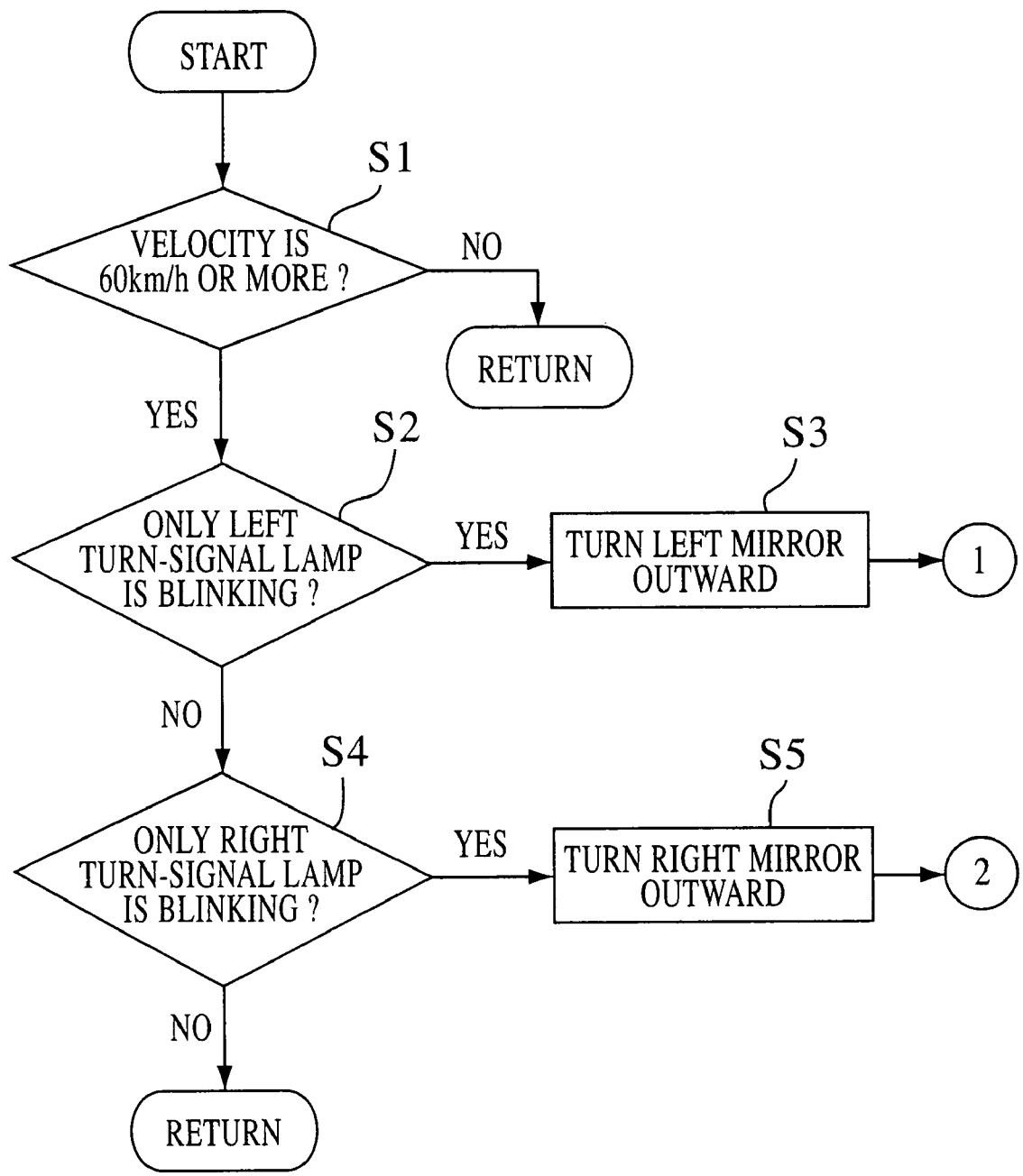
FIG. 4 is a flowchart showing a part of a process for controlling the mirror of the door-mirror using the door-mirror-controlling apparatus according to embodiment of the invention.

The velocity detector 9 outputs the velocity signal to the MPU 33, and the MPU 33 determines (checks) whether or not the automobile is moving at 60 km per hour or more on the basis of the velocity signal input thereto, as shown in FIG. 4 (step S1).

When it is determined that the automobile is moving at 60 km per hour or more, the MPU 33 determines (checks) whether or not the ECU 3 has detected the transmission of the left blink signal to the left turn-signal lamp 11 (step S2).

When it is determined that the transmission of the left blink signal to the left turn-signal lamp 11 has been detected, the MPU 33 transmits the left outer-turn-start signal to the motor driver circuit 35 and controls the left DC motor 15a such that the mirror 27 in the left door-mirror unit faces outward, away from the automobile, compared to the current state (step S3). Then, the process proceeds to step S6 (see FIG. 5). In the present embodiment, the time from when the left turn-signal lamp 11 starts blinking to when the control of the left DC motor 15a completes its operation is about 0.6 seconds.

The control operation will be described in detail below with reference to FIG. 3.

When it is determined that the left turn-signal lamp 11 is blinking, the MPU 33 outputs the left outer-turn-start signal to the motor driver 39.

When the motor driver 39 receives the left outer-turn-start signal, it applies a predetermined direct voltage between the terminals of the left DC motor 15a.

When the left DC motor 15a receives the voltage, it starts rotating in the forward direction and drives the actuator assembly 29 such that the mirror 27 turns outward, away from the automobile.

When the left DC motor 15a starts rotating, the rotational-angle detector circuit 37 starts detecting the variation in the voltage across the resistor 41 in the motor driver circuit 35 as the waveform signal. The detected waveform signal includes not only the desired specific pulse signal caused by the rotation of the left DC motor 15a, but also the high-frequency components generated immediately after the specific pulse signal and the low-frequency components applied in consideration of the influence on other electronic devices.

The detected waveform signal is input to the low-pass filter 43 so that the high-frequency components of the noise included in the waveform signal are removed. The characteristics of the low-pass filter 43 are set such that components in a frequency range above the desired specific pulse signal are removed.

The waveform signal from which the high-frequency components are removed is input to both the high-pass filter 45a for the forward rotation, and the high-pass filter 45b for the reverse rotation. The characteristics of the high-pass filter 45a are set suitably for the forward rotation of the left DC motor 15a and the characteristics of the high-pass filter 45b are set suitably for the reverse rotation of the left DC motor 15a. Therefore, even when the voltage level of the waveform signal obtained when the left DC motor 15a rotates in the forward direction and that obtained when the DC motor 15a rotates in the reverse direction largely differ from each other, the two high-pass filters 45a and 45b remove the low-frequency components corresponding to the respective voltage levels.

The low-frequency components included in the waveform signal are removed by at least one of the high-pass filters 45a and 45b. Waveform signals output from the high-pass filters 45a and 45b are input to the analog switch 51 after the shapes thereof are limited by the limiters 49a and 49b, respectively.

The MPU 33 controls the analog switch 51 such that only the specific pulse signal input from the high-pass filter 45a, whose characteristics are set suitable for the forward rotation, is extracted (generated) and output to the waveform-shaping circuit 53.

The specific pulse signal input to the waveform-shaping circuit 53 is converted into square digital pulses, and the thus obtained digital pulses are output to the MPU 33. The digital pulses are derived only from the specific pulse signal generated by the rotation of the left DC motor 15a, and therefore the rotational angle of the motor can be accurately calculated by counting the number of digital pulses.

The MPU 33 counts the number of digital pulses input from the waveform-shaping circuit 53 included in the rotational-angle detector circuit 37 and calculates the angle by which the mirror 27 is turned on the basis of the number of pulses corresponding to a single turn of the motor which is set in advance, the relationship between the number of turns of the motor and the angle by which the mirror 27 is turned, the normal mirror angle, an outward-facing mirror angle, a coefficient for compensating for the inertial rotation of the motor, and the number of pulses input from the rotational-angle detector circuit 37. The outward-facing mirror angle refers to the angle of each mirror 27 in the horizontal direction set when the corresponding turn-signal lamp is blinking. The driver inputs this angle in the MPU 33 in advance. In the present embodiment, the difference between the normal mirror angle and the outward-facing mirror angle is 2°. In addition, in the present invention, an outward-facing state of the mirror 27 refers to the state in which the angle of the mirror 27 is set to the outward-facing mirror angle. In addition, in the present invention, the amount of control of the mirror surface corresponds to the angle by which the mirror 27 is turned.

As an example, the case is considered in which six pulses are generated each time the left DC motor 15a rotates by one turn and the gear ratio of a reduction gear device connecting the mirror 27 and the left DC motor 15a is set such that the mirror angle changes by 10° when the left DC motor 15a rotates by 20 turns. In this case, the angle of the mirror 27 changes by 2° when the number of digital pulses generated is 24.

The MPU 33 controls the motor driver 39 on the basis of the calculation result such that the mirror 27 reliably stops at the outward-facing mirror angle. Accordingly, the mirror 27 stops at the outward-facing mirror angle.

Completion of Lane Change to the Left

When the lane change to the left is completed, the driver returns the steering wheel to its original position. Accordingly, the turn-signal switch 10, which has been turned on to the left, is turned off. In this case, it is assumed that that the automobile is continuously moving at 80 km per hour. At this time, the angle of the mirror 27 is still at the outward-facing mirror angle.

First, the left turn-signal lamp 11 stops blinking. At the same time, the ECU 3 (MPU 33) detects that the turn-signal switch 10 has been turned off, that is, that the driver has performed an operation for causing the left turn-signal lamp 11 to go out (see FIG. 3). In addition, the velocity detector 9 outputs the velocity signal to the MPU 33.

As shown in FIG. 5, the MPU 33 determines whether or not the left turn-signal lamp 11 has gone out on the basis of the information that the turn-signal switch 10 has been turned off, which is detected by the ECU 3 (step S6).

When it is determined that the left turn-signal lamp 11 has gone out, the MPU 33 outputs the left inner-turn-start signal to the motor driver circuit 35 and controls the left DC motor 15a such that the mirror 27 in the left door-mirror unit returns to the normal mirror angle (step S7). Then, the process returns to START (see FIG. 4).

The detailed control operation will be described below with reference to FIG. 3.

When it is determined that the left turn-signal lamp 11 has gone out, the MPU 33 outputs the left inner-turn-start signal to the motor driver 39.

When the motor driver 39 receives the left inner-turn-start signal, it applies a predetermined direct voltage between the terminals of the left DC motor 15a included in the left door-mirror unit in the direction opposite to that in the case in which the mirror 27 is turned outward, away from the automobile. When the left DC motor 15a receives the voltage, it starts rotating in the reverse direction and drives the actuator assembly 29 such that the mirror 27 turns inward toward the automobile.

Similar to the case in which the mirror 27 is turned outward, away from the automobile, the rotational-angle detector circuit 37 detects the variation in the voltage across the resistor 41 of the motor driver circuit 35 as the waveform signal. The noise components in the waveform signal, that is, the high-frequency components and the low-frequency components are removed by the low-pass filter 43 and the high-pass filters 45a and 45b.

The MPU 33 controls the analog switch 51 such that only the specific pulse signal input from the high-pass filter 45b, whose characteristics are set suitably for reverse rotation, is extracted and output to the waveform-shaping circuit 53.

The specific pulse signal input to the waveform-shaping circuit 53 is converted into square digital pulses, and the thus obtained digital pulses are output to the MPU 33. Similar to the case in which the mirror 27 is turned outward, away from the automobile, the MPU 33 counts the number of digital pulses input from the waveform-shaping circuit 53 and calculates the angle by which the mirror 27 is turned. The MPU 33 controls the motor driver 39 on the basis of the calculation result such that the mirror 27 reliably stops at the normal mirror angle. Accordingly, the mirror 27 stops at the normal mirror angle.

As described above, according to the present embodiment, the reflective surface of the mirror 27 in the left door-mirror unit faces outward, away from the vehicle, compared to the normal driving state while the left turn-signal lamp 11 is blinking. Therefore, the driver can easily see the side of the automobile. Accordingly, the driver can visually check the left side of the automobile with a small action. Thus, the driver's action for visually checking the left side of the automobile, when the driver tries to move to the left lane, is reduced.

When the left turn-signal lamp 11 starts blinking, the MPU 33 only controls the orientation of the reflective surface of the mirror 27 in the left door-mirror unit. Thus, when one of the left and right turn-signal lamps starts blinking, the MPU 33 controls the orientation of the reflective surface of the mirror 27 in the corresponding door-mirror unit instead of controlling the orientation of both of the reflective surfaces of the mirrors 27 in the left and right door-mirror units. Accordingly, the durability of, for example, the gear devices (not shown) for moving the reflective surfaces of the mirrors 27 is increased.

In addition, when the left turn-signal lamp 11 goes out while the reflective surface of the mirror 27 in the left door-mirror unit is facing outward, away from the vehicle, compared to the normal driving state, the reflective surface of the mirror 27 in the left door-mirror unit returns to the normal mirror angle. Accordingly, after the completion of the lane change to the left, that is, after the automobile has returned to the normal driving state, the viewing range of the left door-mirror unit returns to that in the normal driving state.

When the DC motor 15a rotates for adjusting the angle of the mirror 27, the current i applied to the DC motor 15a varies. Accordingly, in the present embodiment, the rotational angle of the DC motor 15a, that is, the angle by which the mirror 27 is turned is determined on the basis of the variation in the current i. Therefore, the mirror 27 is reliably stopped at the outward-facing mirror angle and is reliably turned back to the normal mirror angle without using a position sensor for detecting the position of the mirror 27. As a result, the size of the door-mirror-controlling apparatus 1 is reduced.

In the present embodiment, the MPU 33 outputs the left outer-turn-start signal to the motor driver circuit 35 when the left turn-signal lamp 11 starts blinking. However, the MPU 33 may also output the left outer-turn-start signal to the motor driver circuit 35 when the turn-signal switch 10 is switched on or when the steering angle of the steering wheel is increased to a predetermined angle or more. In other words, the MPU 33 may also output the left outer-turn-start signal to the motor driver circuit 35 when the ECU 3 detects an operation of switching on the turn-signal switch 10 or an operation of increasing the steering angle to the predetermined angle or more.

Next, an example will be described in which the MPU 33 outputs the left outer-turn-start signal to the motor driver circuit 35 when it detects the operation of increasing the steering angle of the steering wheel to the predetermined angle or more.

First, the steering-angle sensor 22 detects the steering angle. Next, the ECU 3 detects a signal representing the steering angle detected by the steering-angle sensor 22. Then, the MPU 33 checks this signal and outputs the left outer-turn-start signal to the motor driver circuit 35, if the signal satisfies a predetermined condition (that is, if the steering angle is the predetermined angle or more). Accordingly, the mirror 27 in the left door-mirror unit turns outward. Then, when the reflective surface of the mirror 27 in the left door-mirror unit is turned outward by the predetermined angle, the MPU 33 stops transmitting the left outer-turn-start signal to the motor driver circuit 35. Then, if the ECU 3 detects that the steering angle is reduced to below the predetermined angle, the MPU 33 outputs the left inner-turn-start signal to the motor driver circuit 35. Accordingly, the reflective surface of the mirror 27 in the left door-mirror unit returns to the basic state.

In the present embodiment, the reflective surface of the mirror 27 in the left door-mirror unit returns to the normal mirror angle when the left turn-signal lamp 11 stops blinking. However, the reflective surface of the mirror 27 in the left door-mirror unit may also return to the normal mirror angle when the turn-signal switch 10 is turned off, when the steering angle is reduced to below the above-described predetermined angle, when hazard lamps start blinking, or when the velocity of the automobile is reduced to a predetermined velocity (40 km per hour in the present embodiment) or less (see step S6 in FIG. 5). In other words, the MPU 33 may also output the left inner-turn-start signal to the motor driver circuit 35 when the ECU 3 detects the operation of switching off the turn-signal switch 10, the operation of reducing the steering angle to below the predetermined angle, the operation for causing the hazard lamps to blink, or the operation of reducing the velocity of the automobile to a predetermined velocity or less. The hazard lamps are caused to blink while the automobile is moving at 60 km per hour or more when, for example, a traffic jam occurs.

In addition, although the difference between the normal mirror angle and the outward-facing mirror angle is set to 2° in the present embodiment, the angle difference may also be set to other values. In addition, although the difference between the normal mirror angle and the outward-facing mirror angle is set to 2° irrespective of the velocity of the automobile, the angle difference may also be changed in accordance with the velocity.

Second Embodiment

The second embodiment is similar to the first embodiment except that the case in which the automobile moves to the right is described.

When the driver tries to move to the right lane, he or she turns on the turn-signal switch 10 to the right. Here it is assumed that the automobile is moving at 80 km per hour.

First, the right turn-signal lamp 13 starts blinking. At the same time, the ECU 3 detects that the turn-signal switch 10 has transmitted the right blink signal to the right turn-signal lamp 13, that is, that the driver has performed the operation for causing the right turn-signal lamp 13 to blink.

The velocity detector 9 outputs the velocity signal to the MPU 33 (ECU 3), and the MPU 33 determines whether or not the automobile is moving at 60 km per hour or more on the basis of the velocity signal input thereto, as shown in FIG. 4 (step S1).

When it is determined that the automobile is moving at 60 km per hour or more, the MPU 33 determines whether or not the ECU 3 has detected the transmission of the left blink signal to the left turn-signal lamp 11 (step S2).

When it is determined that the transmission of the left blink signal to the left turn-signal lamp 11 has not been detected, the MPU 33 determines whether or not the ECU 3 has detected the transmission of the right blink signal to the right turn-signal lamp 13 (step S4).

When it is determined that the transmission of the right blink signal to the right turn-signal lamp 13 has been detected, the MPU 33 transmits the right outer-turn-start signal to the motor driver circuit 35 and controls the right DC motor 15b such that the reflective surface of the mirror 27 in the right door-mirror unit 23 faces outward, away from the automobile, compared to its original state (step S5). Then, the process proceeds to step S8 (see FIG. 6).

The detailed operation for causing the reflective surface of the mirror 27 in the right door-mirror unit 23 to face outward, away from the automobile, is similar to that for causing the reflective surface of the mirror 27 in the left door-mirror unit to face outward, away from the automobile.

Then, when the lane change to the right is completed, the driver returns the steering wheel to its original position. Accordingly, the turn-signal switch 10, which has been turned on to the left, is turned off. In this case, it is assumed that the automobile is moving at 80 km per hour.

First, the right turn-signal lamp 13 stops blinking. At the same time, the ECU 3 detects that the turn-signal switch 10 has been turned off, that is, that the driver has performed an operation for causing the right turn-signal lamp 13 to go out (see FIG. 3). In addition, the velocity detector 9 outputs the velocity signal to the MPU 33.

As shown in FIG. 6, the MPU 33 determines whether or not the right turn-signal lamp 13 has gone out on the basis of the information that the turn-signal switch 10 has been turned off, which is detected by the ECU 3 (step S8).

When it is determined that the right turn-signal lamp 13 has gone out, the MPU 33 outputs the right inner-turn-start signal to the motor driver circuit 35 and controls the right DC motor 15b such that the reflective surface of the mirror 27 in the right door-mirror unit 23 returns to the normal mirror angle (step S9). Then, the process returns to START (see FIG. 4).

The detailed operation for causing the reflective surface of the mirror 27 in the right door-mirror unit 23 to return to the normal mirror angle is similar to that for causing the reflective surface of the mirror 27 in the left door-mirror unit to return to the normal mirror angle.

Thus, according to the present embodiment, advantages similar to those of the first embodiment can be obtained.

Third Embodiment

The third embodiment is similar to the first embodiment except that the case in which the driver tries to turn left at an intersection while the automobile is moving at 30 km per hour is described.

When the driver tries to turn left at an intersection, he or she switches on the turn-signal switch 10 to the left. Here it is assumed that the automobile is moving at 30 km per hour.

First, the left turn-signal lamp 11 starts blinking. At the same time, the ECU 3 detects that the turn-signal switch 10 has transmitted the left blink signal to the left turn-signal lamp 11.

The velocity detector 9 outputs the velocity signal to the MPU 33, and the MPU 33 determines whether or not the automobile is moving at 60 km per hour or more on the basis of the velocity signal input thereto, as shown in FIG. 4 (step S1).

When it is determined that the automobile is not moving at 60 km per hour or more, the process returns to START. Accordingly, the angle of the reflective surface of the mirror 27 in each door-mirror unit is maintained at the normal mirror angle.

The reason why the angle of the reflective surface of the mirror 27 in each door-mirror unit is maintained at the normal mirror angle is because the driver visually checks a region near the left side of the automobile when he or she tries to turn left at the intersection at a low velocity. This is why the reflective surface of the mirror 27 in each door-mirror unit is maintained at the normal mirror angle when the automobile is moving at a low velocity.

Similarly, when the driver switches on the turn-signal switch 10 to the right to turn right while the automobile is moving at 30 km per hour, the reflective surface of the mirror 27 in each door-mirror unit is maintained at the normal mirror angle.

Thus, according to the present embodiment, when the automobile is moving at less than 60 km, the reflective surface of the mirror 27 in the left door-mirror unit is maintained at the normal mirror angle. In this case, the driver can easily see the region near the left side of the automobile. Therefore, when the automobile turns left at an intersection while moving at a low velocity, the driver can visually check the region near the left side of the automobile.

Although the reflective surface of the mirror 27 in the left door-mirror unit is maintained at the normal mirror angle when the automobile is moving at a velocity of less than 60 km per hour in the present embodiment, the velocity is not limited to this value.

Other Embodiments

The present invention is not limited to the above-described embodiments, but covers other various embodiments. More specifically, in the above-described embodiments, the rotational angle of the DC motor 15a is detected on the basis of the variation in the voltage across the resistor 41 when the current i is supplied to the DC motor 15a from the MPU 33. However, the present invention is not limited to this, and the rotational angle of the DC motor 15a may also be detected on the basis of the variation in the voltage applied between the terminals of the DC motor 15a.

In addition, although the present invention is applied to the door mirrors as an example of side mirrors in the above-described embodiments, the present invention may also be applied to, for example, fender mirrors.

As described above, the present invention is useful when, for example, an automobile changes lanes.

What is claimed is:

1. A rear view side-mirror-controlling apparatus comprising:
   direction-changing means for driving mirrors included in left and right rear view side-mirror units of a vehicle so as to change orientations of mirror surfaces of the mirrors; and
   controlling means for controlling the direction-changing means,
   wherein the controlling means detects an operation performed by a driver of the vehicle when the driver tries to change lanes or turn left or right, and controls the direction-changing means such that the mirror surface of at least one of the mirrors is put into an outward-facing state in which the mirror surface faces outward, away from the vehicle, compared to a basic state when the controlling means detects an operation performed by said driver,
   wherein the rear view side-mirror unit includes a shell, the mirror disposed at a rear side of the shell with respect to the vehicle, a DC motor disposed in the shell, and an actuator assembly disposed in the shell and driven by the DC motor,
   wherein the mirror is attached to the actuator assembly at a rear side thereof, with respect to the vehicle,
   wherein a rotational angle of the mirror is changed according to a rotation amount of the DC motor,
   wherein the controlling means comprises a rotational angle detector circuit and a microprocessor unit,
   wherein the rotational angle detector circuit calculates the rotational angle of the mirror, and sends the calculated rotational angle of the mirror to the microprocessor unit, and
   wherein the microprocessor unit, based on the rotational angle of the mirror, controls the DC motor to rotate until the rotation angle of the mirror reaches a predetermined angle.

2. The rear view side-mirror-controlling apparatus according to claim 1, wherein said operation includes the operation for causing a left turn-signal lamp or a right turn-signal lamp to blink, the operation of switching on a turn-signal switch, and the operation of increasing a steering angle of a steering wheel to a predetermined angle or more, and the controlling means controls the direction-changing means such that the mirror surface of at least one of the mirrors is put into the outward-facing state when the controlling means detects one of said operations.

3. The rear view side-mirror-controlling apparatus according to claim 2, wherein said controlling means further detects at least one of said operations for causing the left turn-signal lamp or the right turn-signal lamp to go out, the operation of switching off the turn-signal switch, and the operation of reducing the steering angle to less than the predetermined angle, and
   wherein, when the controlling means detects one of the operations for causing the left turn-signal lamp or the right turn-signal lamp to go out, the operation of switching off the turn-signal switch, and the operation of reducing the steering angle to less than the predetermined angle after controlling the direction-changing means such that the mirror surface of at least one of the mirrors is put into the outward-facing state, the controlling means controls the direction-changing means such that the mirror surface returns to its normal state.

4. The rear view side-mirror-controlling apparatus according to one of claims 2 and 3, wherein the controlling means controls the direction-changing means so as to change the orientation of the mirror surface in the left side-mirror unit when the controlling means detects one of the operation for causing the left turn-signal lamp to blink, the operation of switching on the turn-signal switch to the left, and the operation of increasing the steering angle to the predetermined angle or more in the leftward direction, and controls the direction-changing means so as to change the orientation of the mirror surface in the right side-mirror unit when the controlling means detects one of the operation for causing the right turn-signal lamp to blink, the operation of switching on the turn-signal switch to the right, and the operation of increasing the steering angle to the predetermined angle or more in the rightward direction.

5. The rear view side-mirror-controlling apparatus according to one of claims 1 to 3, further comprising velocity-detecting means for detecting the velocity of the vehicle,
   wherein the controlling means controls the direction-changing means such that the mirror surfaces are kept in the normal state while the velocity of the vehicle is a predetermined velocity or less.

6. The rear view side-mirror-controlling apparatus according to one of claims 1 to 3, wherein the rotational angle detector circuit detects a current variation caused by the rotation of the DC motor as a waveform signal, and outputs a specific pulse signal generated from the detected waveform signal, and the microprocessor unit counts the number of pulses included in the specific pulse signal output from the rotational angle detector circuit, calculates an amount of control required for changing the orientation of the corresponding mirror surface on the basis of the number of pulses, and controls the DC motor on the basis of the result of said calculation.

7. A rear view side-mirror-controlling apparatus, comprising:
   left and right rear view side-mirror units of a vehicle, which units each comprise a mirror and a drive device operatively connected to the mirror, which drives the mirror to change the orientation of the mirror surface, a controller which controls the drive device, wherein the controller detects operations performed by a driver of the vehicle when the driver tries to change lanes or turn left or right, and controls the drive device when the controller detects one of the operations so that the mirror surface of at least one of the mirrors is put into an outward-facing state in which the mirror surface faces outward, away from the vehicle, compared to a basic state, wherein the rear view side-mirror unit includes a shell, the mirror disposed at a rear side of the shell with respect to the vehicle, a DC motor disposed in the shell, and an actuator assembly disposed in the shell and driven by the DC motor, wherein the mirror is attached to the actuator assembly at a rear side thereof, with respect to the vehicle, wherein a rotational angle of the mirror is changed according to a rotation amount of the DC motor, wherein the controller comprises a rotational angle detector circuit and a microprocessor unit, wherein the rotational angle detector circuit calculates the rotational angle of the mirror, and sends the calculated rotational angle of the mirror to the microprocessor unit, and wherein the microprocessor unit, based on the rotational angle of the mirror, controls the DC motor to rotate until the rotation angle of the mirror reaches a predetermined angle.

8. The rear view side-mirror-controlling apparatus according to claim 7, wherein said operation includes the operation for causing a left turn-signal lamp or a right turn-signal lamp to blink, the operation of switching on a turn-signal switch, and the operation of increasing a steering angle of a steering wheel to a predetermined angle or more, and the controller controls the drive device such that the mirror surface of at least one of the mirrors is put into the outward-facing state when the controller detects one of said operations.

9. The rear view side-mirror-controlling apparatus according to claim 8, wherein said controller further detects at least one of said operations for causing the left turn-signal lamp or the right turn-signal lamp to go out, the operation of switching off the turn-signal switch, and the operation of reducing the steering angle to less than the predetermined angle, and wherein, when the controller detects one of the operations for causing the left turn-signal lamp or the right turn-signal lamp to go out, the operation of switching off the turn-signal switch, and the operation of reducing the steering angle to less than the predetermined angle after controlling the drive device such that the mirror surface of at least one of the mirrors is put into the outward-facing state, the controller controls the drive device such that the mirror surface returns to its normal state.

10. The rear view side-mirror-controlling apparatus according to one of claims 8 and 9, wherein the controller controls the drive device so as to change the orientation of the mirror surface in the left rear view side-mirror unit when the controller detects one of the operation for causing the left turn-signal lamp to blink, the operation of switching on the turn-signal switch to the left, and the operation of increasing the steering angle to the predetermined angle or more in the leftward direction, and controls the drive device so as to change the orientation of the mirror surface in the right side-mirror unit when the controller detects one of the operation for causing the right turn-signal lamp to blink, the operation of switching on the turn-signal switch to the right, and the operation of increasing the steering angle to the predetermined angle or more in the rightward direction.

11. The rear view side-mirror-controlling apparatus according to one of claims 7 to 9, further comprising a velocity-detector, wherein the controller controls the drive device such that the mirror surfaces are kept in the normal state while the velocity of the vehicle is a predetermined velocity or less.

12. The rear view side-mirror-controlling apparatus according to one of claims 7 to 9, wherein the rotational angle detector circuit detects a current variation caused by the rotation of the DC motor as a waveform signal, and outputs a specific pulse signal generated from the detected waveform signal, and the microprocessor unit counts the number of pulses included in the specific pulse signal output from the rotational angle detector circuit, calculates an amount of control required for changing the orientation of the corresponding mirror surface on the basis of the number of pulses, and controls the DC motor on the basis of the result of said calculation.

13. A rear view side-mirror-controlling apparatus, comprising:

left or right rear view side-mirror unit of a vehicle, which unit comprises a mirror and a drive device operatively connected to the mirror, which drives the mirror to change the orientation of the mirror surface, a controller which controls the drive device, wherein the controller detects operations performed by a driver of the vehicle when the driver tries to change lanes or turn left or right, and controls the drive device when the controller detects one of the operations so that the mirror surface of the mirror is put into an outward-facing state in which the mirror surface faces outward, away from the vehicle, compared to a basic state, wherein the rear view side-mirror unit includes a shell, the mirror disposed at a rear side of the shell with respect to the vehicle, a DC motor disposed in the shell, and an actuator assembly disposed in the shell and driven by the DC motor, wherein the mirror is attached to the actuator assembly at a rear side thereof, with respect to the vehicle, wherein a rotational angle of the mirror is changed according to a rotation amount of the DC motor wherein the controller comprises a rotational angle detector circuit and a microprocessor unit, wherein the rotational angle detector circuit calculates the rotational angle of the mirror, and sends the calculated rotational angle of the mirror to the microprocessor unit, and wherein the microprocessor unit, based on the rotational angle of the mirror, controls the DC motor to rotate until the rotation angle of the mirror reaches a predetermined angle.

14. The rear view side-mirror-controlling apparatus according to claim 1, wherein the mirror is attached to the actuator assembly with a base plate interposed therebetween.

15. The rear view side-mirror-controlling apparatus according to claim 7, wherein the mirror is attached to the actuator assembly with a base plate interposed therebetween.

16. The rear view side-mirror-controlling apparatus according to claim 13, wherein the mirror is attached to the actuator assembly with a base plate interposed therebetween.

* * * * *